US 6,609,963 B2

(12) United States Patent
Li et al.

(10) Patent No.: US 6,609,963 B2
(45) Date of Patent: Aug. 26, 2003

(54) VITRIFIED SUPERABRASIVE TOOL AND METHOD OF MANUFACTURE

(75) Inventors: Rounan Li, Shrewsbury, MA (US); Leonard G. Pukaite, West Boylston, MA (US)

(73) Assignee: Saint-Gobain Abrasives, Inc., Worcester, MA (US)

( * ) Notice: Subject to any disclaimer, the term of this patent is extended or adjusted under 35 U.S.C. 154(b) by 0 days.

(21) Appl. No.: 09/934,261

(22) Filed: Aug. 21, 2001

(65) Prior Publication Data

US 2003/0045221 A1 Mar. 6, 2003

(51) Int. Cl.$^7$ ............................................. B23F 21/03
(52) U.S. Cl. ........................................ 451/541; 451/546
(58) Field of Search ............................... 451/541, 542, 451/544, 546, 178; 51/295, 296, 297, 298, 307

(56) References Cited

U.S. PATENT DOCUMENTS

| | | |
|---|---|---|
| 2,309,463 A | 1/1943 | Lombard et al. |
| 2,332,241 A | 10/1943 | Lombard et al. |
| 2,334,266 A | 11/1943 | Houchins |
| 2,343,218 A | 2/1944 | Lombard |
| 2,986,455 A | 5/1961 | Sanmeyer |
| 3,925,035 A | 12/1975 | Keat |
| 3,986,847 A | 10/1976 | Balson |
| 4,157,897 A | 6/1979 | Keat |
| 4,334,895 A | 6/1982 | Keat |
| 4,347,295 A | 8/1982 | Herczog |
| 4,543,107 A | 9/1985 | Rue |
| 4,618,349 A | 10/1986 | Hashimoto et al. |
| 4,634,453 A | 1/1987 | Hay et al. |
| 4,898,597 A | 2/1990 | Hay et al. |
| 4,951,427 A | 8/1990 | St. Pierre |
| 4,997,461 A | 3/1991 | Markhoff-Matheny et al. |
| 5,037,452 A | 8/1991 | Gary et al. |
| 5,037,453 A | 8/1991 | Narayanan et al. |
| 5,094,672 A | 3/1992 | Giles, Jr. et al. |
| 5,095,665 A | 3/1992 | Nagata et al. |
| 5,118,326 A | 6/1992 | Lee et al. |
| 5,129,919 A | 7/1992 | Kalinowski et al. |
| 5,131,923 A | 7/1992 | Markhoff-Matheny et al. |
| 5,203,886 A | 4/1993 | Sheldon et al. |
| 5,250,084 A | 10/1993 | Lansell et al. |
| 5,256,603 A | 10/1993 | Andrus et al. |
| 5,300,129 A | 4/1994 | Clark |
| 5,401,284 A | 3/1995 | Sheldon et al. |
| 5,472,461 A | 12/1995 | Li |
| 5,536,282 A | 7/1996 | Yoon et al. |
| 5,536,283 A | 7/1996 | Sheldon et al. |
| 5,607,489 A | 3/1997 | Li |
| 5,711,774 A | 1/1998 | Sheldon |
| 5,863,308 A | 1/1999 | Qi et al. |
| 6,066,189 A | 5/2000 | Meyer et al. |
| 6,074,278 A | 6/2000 | Wu et al. |
| 6,086,648 A | 7/2000 | Rossetti, Jr. et al. |
| 6,093,225 A * | 7/2000 | Itoh .............................. 51/295 |
| 6,102,789 A * | 8/2000 | Ramanath et al. ........... 451/541 |
| 6,123,743 A | 9/2000 | Carman et al. |
| 6,217,413 B1 | 4/2001 | Christianson |
| 6,450,870 B2 * | 9/2002 | Ito ............................... 451/542 |

FOREIGN PATENT DOCUMENTS

| | | |
|---|---|---|
| JP | 54/39292 | 3/1979 |
| JP | 62-297070 | 12/1987 |
| JP | 63-256364 | 10/1988 |
| JP | 10138148 | 5/1998 |
| SU | 1418730 | 12/1975 |

OTHER PUBLICATIONS

R.H. Wentorf, Jr., Carbon (Diamond, Synthetic), Kirk–Othmer, *Encyclopedia of Chemical Technology*, 4$^{th}$ Ed., vol. 4, pp. 1082–1096.

Barry, T.I., et al., "The Strength of Experimental Grinding Wheel Materials including Use of Novel Glass and Glass-Ceramic Bonds," Trans. J. Brit. Ceram. Soc., 79:139–145 (1980).

"Abrasives," Ullman's Encyclopedia of Industrial Chemistry, VCH, 5th Ed. vol. A1:11–12 (1985).

"Tables and Figures," Handbook of Glass Properties, Bansal, et al., Academic Press, Inc. p. 385 (1986).

Kingery, W.D., "Introduction to Ceramics," *Wiley & Sons*, 2$^{nd}$ Ed. pp. 778–882 (1976).

Kirk–Othmer, *Encyclopedia of Chemical Technology*, 3$^{rd}$ Ed., vol. 5, p. 263 (1979).

*Encyclopedia of Materials Science and Engineering*, vol. 3, Pergamon Press Ltd., pp. 2205–2208 (1986).

* cited by examiner

Primary Examiner—Dung Van Nguyen
(74) Attorney, Agent, or Firm—Mary E. Porter

(57) ABSTRACT

An abrasive tool includes a superabrasive grain component, a filler component that comprises hollow bodies and a vitreous bond. Natural and synthetic diamond, cubic boron nitride and combinations thereof can be employed as the superabrasive grain component. The vitreous bond component includes zinc oxide and at least two alkali metal oxides. The vitreous bond component can further include barium oxide. A method for producing an abrasive tool includes combining a superabrasive grain component, a filler component that includes hollow bodies and a vitreous bond component that includes zinc oxide and at least two alkali metal oxides. The combined components are fired at a temperature in a range of between about 600° C. and about 850° C., preferably in an ambient air atmosphere.

26 Claims, No Drawings

VITRIFIED SUPERABRASIVE TOOL AND METHOD OF MANUFACTURE

BACKGROUND OF THE INVENTION

Materials such as diamond film obtained by chemical vapor deposition (CVD diamond), polycrystalline diamond (PCD), crystalline boron nitride (CBN) and polycrystalline boron nitride (PCBN) are among the hardest materials known. Cutting tools made with tip inserts of PCD or other hard materials are difficult to manufacture. Typical cutting tool processes require two grinding operations, a rough grind and a finish grind, carried out with different abrasive wheels. Many of the conventional abrasive tools employed in roughing and finishing these materials include metal-bonded superabrasive. Metal-bonded abrasive tools generally grind fewer parts per hour than glass bonded tools.

Glass-bonded superabrasive tools have attractive temperature characteristics, but tend to be brittle and wear more rapidly than metal bond tools. In addition, glass-bonded diamond tools can have performance deficiencies caused by poor diamond-to-glass bonding. Further, existing methods for fabricating glass-bonded diamond tools typically require high temperatures, long cycles and non-oxidizing or reducing atmospheres.

Therefore, a need exists for grinding tools capable of roughing or finishing hard workpieces, as well as for methods for manufacturing such tools, that reduce or eliminate the above-mentioned problems.

SUMMARY OF THE INVENTION

The invention generally relates to an abrasive tool and a method of making an abrasive tool.

The abrasive tool includes a superabrasive grain component, a filler component that includes hollow bodies, and a vitreous bond component. The vitreous bond component includes zinc oxide and at least two alkali metal oxides. In one embodiment of the invention the abrasive tool includes a core and an abrasive rim at the perimeter of the core. In another embodiment the abrasive tool includes a vitreous bond component that is fired at a temperature less than about 850° C.

The method of making an abrasive tool includes combining a superabrasive grain component, a filler component and a vitreous bond component that includes zinc oxide and at least two alkali metal oxides. The combined components are fired at a temperature in a range of between about 600° and about 850° C. The resulting fired components can be attached to a core.

The abrasive tool of the invention can be used in grinding cutting tool inserts. A method of grinding a diamond based cutting tool insert includes selecting an abrasive tool such as described above, contacting the abrasive tool with the insert and grinding the insert edge. The insert edge obtained by the method of the invention is substantially free of chips and/or irregularities.

The invention has numerous advantages. For example, the vitreous bond typically provides good glass-to-diamond bonding, resulting in an abrasive tool that is well-suited to roughing and precision grinding of hard materials, such as polycrystalline diamond, diamond film, boron nitride, ceramics and hardened metals. In use, the abrasive tool of the invention can be mounted on a metallic core and generally offers improved productivity, good edge quality and reduced wheel wear. The same abrasive tool can be employed for rough grinding and finishing operations. The method of the invention can be conducted at relatively low temperature and can employ relatively short soak (or firing) times. Further, the need for non-oxidizing atmospheres, such as nitrogen gas or a source of reducing carbon, can be significantly reduced or eliminated from the manufacturing process.

DETAILED DESCRIPTION OF THE INVENTION

The invention generally is related to abrasive tools. Examples of abrasive tools include wheels, disks, wheel segments, stones, and hones. The invention also relates to a method of making abrasive tools.

The abrasive tool of the invention includes a superabrasive grain component, a filler component that includes hollow bodies, and a vitreous bond component that includes zinc oxide and at least two metal oxides. Generally, the abrasive tool is a bonded abrasive tool, as opposed to, for example, a coated abrasive tool.

"Superabrasive," as that term is employed herein, means abrasives having a hardness, as measured on the Knoop Hardness Scale of at least that of cubic boron nitride (CBN), i.e., a $K_{100}$ of at least 4700. In addition to cubic boron nitride, other examples of superabrasive materials include natural and synthetic diamond. Suitable diamond or cubic boron nitride materials can be crystalline or polycrystalline. Preferably, the superabrasive material is diamond.

The superabrasive material is in the form of grain, also known as "grit." The superabrasive grain component of the invention can be obtained commercially or can be custom-produced. Generally, the superabrasive employed in the present invention has an average particle size in a range of between about 0.5 micrometers (microns, $\mu$m) and about 500 $\mu$m. Preferably, the particle size is in a range of between about 2 $\mu$m and about 200 $\mu$m.

In one embodiment, the superabrasive grain component is present in an amount of at least about 5% by volume of the superabrasive tool. In another embodiment, the superabrasive grain component is present in an amount in a range of between about 5 and about 50% by volume of the superabrasive tool, more preferably between about 20 and about 40% by volume of the superabrasive tool.

The vitreous bond component includes zinc oxide (ZnO) and at least two alkali metal oxides. Vitreous bonds typically are formed by melting raw materials, such as silica ($SiO_2$), clay, feldspar and other materials that can be combined and processed, as is known in the art. Once a glass has been made, it can be ground into a powder, commonly known as a "frit". Silica-alumina glass bonds are commonly used in vitrified bond abrasive tools.

In one embodiment, the vitreous bond component is present in an amount of no more than about 28% by volume of the abrasive tool. In another embodiment, the vitreous bond component is present in a range of between about 14 and about 28% by volume of the abrasive tool, more preferably about 15 to about 22% by volume of the superabrasive tool.

The vitreous bond herein contains ZnO in an amount of about 1–6%, by weight of the vitreous bond component. In a preferred embodiment, the ZnO is present in an amount of about 2–4% by weight of the vitreous bond component.

Examples of suitable alkali metal oxides and suitable amounts of alkali metals of the vitreous bond component include sodium oxide ($Na_2O$, about 3–6 weight %), potassium oxide (K$_2$O, about 4–7 weight %), and lithium oxide (Li$_2$O, about 1–5 weight %). In one embodiment, the alkali metal oxides of the vitreous bond component include sodium oxide and potassium oxide. In another embodiment, the alkali metal oxide of the vitreous bond component further includes lithium oxide.

In one embodiment, the amount of combined alkali metal oxides is about 5–15%, by weight, preferably 8–12 weight % of the vitreous bond component. In another embodiment, the amount of combined alkali metal oxides is greater than about 9%, by weight of the vitreous bond component.

In still another embodiment, the vitreous bond component further includes barium oxide (BaO) in an amount of 1–6% by weight. In a particularly preferred embodiment, barium oxide is present in an amount of about 2–4% by weight of the vitreous bond component. In an especially preferred embodiment, the combined amount of the zinc oxide and barium oxide is at least about 5% of the vitreous bond component.

The vitreous bond component can also include, silica (SiO$_2$), alumina (Al$_2$O$_3$), boron oxide (B$_2$O$_3$), calcium oxide (CaO), magnesium oxide (MgO), and nickel oxide (NiO), and other oxides typically present in minor amounts in glass compositions.

In one embodiment the vitreous component includes a frit of a low temperature firing silica alumina-based glass. The alumina can be present in the vitreous component an amount in a range of between about 1 and about 10 weight percent. Total amounts of silica and alumina generally range from about 51 to about 80 weight percent.

In one example the vitreous bond component includes between about 50 and about 70 weight percent, preferably between about 55 and about 65 weight percent of SiO$_2$; between about 16 and about 25, preferably between about 18 and 22 weight percent of (B$_2$O$_3$); between about 5 and about 15 percent, preferably between about 8 and about 12 percent of alkali metal oxides; between about 1 and about 6 weight percent, preferably between about 2 and about 4 weight percent BaO; and between about 1 and about 6 weight percent, preferably between about 2 and about 4 weight percent of ZnO. In a preferred embodiment, the vitreous bond is fused to the abrasive grain at a temperature below 850° C. By fused, it is meant that the vitreous bond component is melted to coat and adhere to the abrasive grain resulting, upon cooling, in a bonded abrasive article.

The filler component of the abrasive tool of the invention includes hollow bodies. As used herein, the term "hollow" means having an empty space or cavity within a wall that is essentially impermeable to liquids. Hollow bodies can be of any shape. An example of a suitable shape is a spherical shape. In one embodiment, hollow bodies of the filler component have a void volume in a range of between about 30 and about 75%. In one embodiment, the crush strength of the hollow bodies is in a range of between about 2000 psi and about 5000 psi.

Examples of suitable materials of the hollow bodies include glass ceramic mullite, alumina, glass, ceramic bubbles and spheres. Hollow bodies that resist crushing during molding and firing of the abrasive tools are preferred. Suitable hollow bodies are supplied by Environsphere Co., Zeeland Industries, 3-M Specialty Materials, and PQ Corp. In one example the hollow bodies are Z-Light SphereS™ Ceramic Microspheres produced by 3-M Specialty Materials.

In one embodiment, the hollow bodies have an average diameter in a range of between about 10 μm and about 150 μm. Preferably, at least about 90% of the hollow bodies have a particle size within a range of between about 20 μm and about 120 μm.

In one embodiment, the hollow bodies are present in the abrasive tool in an amount of at least about 10% by volume. In another embodiment, the hollow bodies are present in the abrasive tool in an amount in a range of between about 10 and about 30% by volume. Abrasive tools that include at least 90 percent by weight intact hollow bodies are preferred.

In one embodiment of the invention, the abrasive tool includes at least about 15%, by volume, of void space, not including the void space of the hollow bodies. The void space can be, for example, open porosity of the abrasive tool.

The method of the invention includes combining a superabrasive grain component, a filler component having hollow bodies, and a frit bond component that includes zinc oxide and at least two alkali metal oxides. The hollow bodies can be screened to remove broken pieces.

The combined components are fired at a maximum temperature in a range of between about 600° and about 850° C. In one embodiment, the combined components are fired for a period of time in a range of between about 2 and about 7 hours. Total firing cycle is about 12 hours. Quite unexpectedly at such relatively low glass firing temperature the firing cycle time needed for a vitreous bond component comprising silica, zinc oxide, mixed alkali metal oxides and BaO is about half of the time needed for commercial vitrified bonds used for tools containing diamond grain.

In a specific embodiment, the combined components are fired in an ambient air atmosphere. As used herein, the phrase "ambient air atmosphere," refers to air drawn from the environment without treatment.

In one embodiment, the components are combined by mechanical blending. Additional ingredients, such as, for example, organic binder can be included, as is known in the art. Components can be combined sequentially or in a single step. Optionally, the resulting mixture can be screened to remove agglomerates that may have formed during blending.

The mixture is placed in an appropriate mold for pressing. Shaped plungers are usually employed to cap off the mixture. In one example, the combined components are molded and pressed in a shape suitable for a grinding wheel rim. Pressing can be by any means, such as by cold pressing and by hot pressing. Molding and pressing methods that avoid crushing the hollow bodies are preferred.

Cold pressing is preferred and generally includes application, at room temperature, of an initial pressure sufficient to hold the mold assembly together. The initial pressure employed generally is in the range of from about 50 to about 150 tons. The resulting green form of the abrasive tool is then fired. As used herein, the term "green" refers to a body which maintains its shape during the next process step but does not have enough strength to maintain its shape permanently. Firing can be, for example, in air, for a duration of less than 15 hours, and at a temperature that is less than about 850° C., preferably in a range of between about 600° C. and about 750° C.

Hot pressing is described, for example, in U.S. Pat. Nos. 4,157,897 and 2,986,455, the teachings of which are incorporated herein by reference in their entirety. Hot-pressing is also described in Kirk-Othmer, *Encyclopedia of Chemical Technology*, 3$^{rd}$ Ed., 1979, p.263; and in the *Encyclopedia of Materials Science and Engineering*, Vol. 3, Pergamon Press Ltd., 1986, pp. 2205–2208. In one embodiment, pressure is applied prior to, as well as during, firing. In another embodiment, pressure is only applied during firing. In yet another embodiment, referred to as "hot coining," pressure is applied to the mold assembly after the article is removed from the furnace. As used herein, the term "hot pressing" includes "hot coining" procedures. Firing does not require non-oxidizing atmospheres.

Generally, if hot pressing is employed, firing is at a temperature from about 500° C. to about 750° C. and the final molding pressure generally is in a range of between about 0.7 tons per square inch (tsi) and about 1.5 tsi. Holding time within the mold under final temperature and pressure conditions generally is less than about 10 minutes, and preferably in a range of between about 4 and about 8 minutes.

Molding and pressing methods that avoid crushing the hollow bodies are essential. In one embodiment of the invention at least 90 percent by weight of the hollow bodies remain intact after molding and pressing.

The abrasive article is removed from the mold and air-cooled. In a later step, the fired tool can be edged and finished according to standard practice, and then speed-tested prior to use.

In use, the abrasive tool of the invention generally includes an abrasive rim attached at the perimeter of a core. Tools of the invention include type 6A2H, 1A1, 6A1, 4A2, and other wheel shapes. The abrasive rim includes the abrasive grain, vitreous bond and filler components described above. Methods for attaching abrasive grain in a bond, e.g., molded abrasive segments, to a core are known in the art and include, for example, brazing, laser welding, gluing or cementing. Cementing is preferred.

Metal, ceramic, resin and combination cores are known in the art. An example of a suitable core material for an abrasive tool of the invention is an aluminum resin composite material that generally provides good tool vibration dampening. In one embodiment the aluminum resin core has the following composition in weight percent: about 8.3% phenolic resin, about 90% aluminum powder, and about 1.7% line. The core can be fabricated as known in the art by molding core precursors in the shape of the core and sintering at a temperature below the melting temperature of aluminum. Aluminum cores also are well-suited for the abrasive tool of the invention and its applications.

In one embodiment, the tools of the invention is used in grinding cutting tool inserts fabricated from PCD, CDV or other hard superabrasive materials. Both rough grinding and surface finishing can be conducted with the same tool. While benefits of grinding with the abrasive tools of the invention are most pronounced in grinding the edges of PCD inserts, the surface of the cutting tool insert also can be ground with these tools. The grinding operation generally results in surfaces and edges of the inserts that are substantially free of chips or irregularities.

The invention is further described by the following examples which are not intended to be limiting.
Exemplification

EXAMPLE 1

Vitrified test bars were produced for comparison testing employing compositions A and B. Composition A was a frit bond material employed as the vitrified bond in a commercially available diamond wheel used to grind PCD and PCBN materials, in particular diamond-based cutting tool inserts, e.g., PCD, CVD and others. Composition A included 59–72 weight % $SiO_2/Al_2O_3$; 20–23 weight % $B_2O_3$, 1–2 weight % CaO and about 5.0 weight % of $Na_2O$. Composition A did not include ZnO, mixed alkali metal oxides, or BaO. Composition B was a vitrified bond of the invention and is shown, in weight percent, in Table 1.

TABLE 1

| Oxide | B |
|---|---|
| $SiO_2$ | 58.01 |
| $Al_2O_3$ | 1.73 |
| $B_2O_3$ | 21.04 |
| CaO | 1.21 |
| ZnO | 3.03 |
| BaO | 2.60 |
| $Na_2O$ | 4.59 |
| $K_2O$ | 5.19 |
| $Li_2O$ | 2.60 |
| Total | 100 |

The test bar composition (volume %), before firing, was: 28% diamond, 15% ceramic hollow spheres, 24.5% glass bond, and 32.5% porosity. The ceramic hollow spheres employed were type SL 50 (60–100 micron) obtained from Environsphere. Diamond (15/25 micron) was obtained from Saint-Gobain Ceramics & Plastics, Inc., Worcester, Mass.

To make the test bars, materials were weighed and mixed by stirring in a bowl and then screened through 105 mesh screen (U.S. standard size) twice. They were then placed in a steel mold of suitable design to yield test samples having following dimensions: 0.24"×0.254"×2.625". The green bodies were then transferred into a furnace and fired at a firing cycle of 100° C./hour from room temperature to the desired temperature and held at that temperature for 4 hours. Firing temperatures and the atmospheres used are shown in Table 2. The samples were cooled down in the furnace.

Modulus of rupture (MOR) was measured on an Instron Model 4204 mechanical testing machine with a 3-point bending jig with an outer span of 2", and at a loading rate of 0.050" per minute cross head speed.

The flexural strength of the samples tested is shown in Table 2, along with the process conditions used in producing them.

TABLE 2

| | A | B |
|---|---|---|
| MOR(psi) | 8369 | 10507–11923 |
| Firing Temperature | 950° C. | 650° C.–700° C. |
| Atmosphere | $N_2$ | Air |

The results shown in Table 2 indicate that vitrified wheels of the invention required lower firing temperatures, could be processed without non-oxidizing atmospheres and had excellent flexural strength.

EXAMPLE 2

Abrasive wheels type 6A2HA using the vitreous bond composition B shown in Table 1 were made as follows. Using a tubular mixer, 162 g quantities of the raw materials were blended in a covered plastic container for 10 minutes to form a bond mixture. The mixture was combined with diamond abrasive grain and glass/ceramic spheres, grade SL150. The diamond abrasive grain was obtained from S-G Ceramics & Plastics, Inc. and had a nominal micron size of 15/25. The glass/ceramics spheres were obtained from Environsphere Co., Australia and had an average diameter of 60–100 $\mu$m.

The mix was screened through a 24 mesh screen (U.S. standard size) to break-up any lumps. The mix was then pressed into a molded ring and the ring was fired in air by ramping the temperature 100° C./hour to a maximum of 800° C. and holding the ring at 800° C. for 4 hours. After firing, the abrasive ring (or rim) was cooled, stripped from the mold and glued to a core.

Either aluminum cores or aluminum-resin composite cores (90 weight % Al powder, 8.3 weight % phenolic resin and 1.7 weight % lime) were used. The composition of the fired abrasive rim of the wheel was 30% diamond, 20% hollow bodies, 17.5% glass bond and 32.5% porosity, all by volume.

Abrasive wheels of the invention on composite or aluminum cores were compared to a commercial wheel, comparative wheel-1, designated for edge grinding of PCD inserts for machine tools. Comparative wheel-1 contained between 30–40 volume percent diamond grain in an unknown vitrified bond. The wheels were mounted on a Cobom RG6 Automatic Grinding Machine. All wheels were 6"×1½"×40 mm 6A2HA type wheels. Each wheel was used to grind four polycrystalline diamond tipped cutting tools that included PCD material designated as GE 1500 PCD. All tests used a wheel speed setting of 2000 rotations per minute (RPM), a grinding pressure setting of 5 and a ¾"×¾"×6" NMVC600J8VCA dressing stick provided by Norton Company, Worcester, Mass. The results are shown in Table 3. As seen in Table 3, both composite and aluminum core wheels of the invention performed as well as the commercial wheel tested.

TABLE 3

|  | w.w./tool[a] Coburn RG6 | Grind Time Automatic grinder | Edge |
| --- | --- | --- | --- |
| Comparative Wheel-1 | 0.001" | N/A | Excellent |
| wheel of the invention on composite core | 0.001" | N/A | Excellent |
| wheel of the invention on Aluminum core | 0.001" | N/A | Excellent |

[a]w.w./tool is the average wheel wear per tool ground.

Abrasive wheels of the invention on composite or aluminum cores also were compared to comparative wheel-2, a commercial PCD grinding wheel mounted on an Ewag RS12 manual grinder. Comparative wheel-2 contained between 30–40 volume % diamond grain in an unknown vitrified bond composition and was designated specifically for use in grinding the edges of PCD inserts for machining tools. All wheels were 6A2HA type wheels. Each wheel was used to grind four polycrystalline tipped cutting tools that included PCD material from GE and were designated as GE 1500 PCD. All tests used a wheel speed setting of 2400 RPM, a constant grinding pressure of 400 Newtons and a 1"×1"×6" NSA800H2VM dressing stick provided by Norton Company. The results are shown in Table 4.

TABLE 4

|  | w.w./tool[a] Ewag RS12 | Grind Time[b] Manual grinder | % reduction | Edge |
| --- | --- | --- | --- | --- |
| Comparative wheel-2 | 0.00064" | 3:70 | — | Excellent |
| wheel of the invention on composite core | 0.00043" | 2:84 | −49% ww/tool −30% grind time | Excellent |
| wheel of the invention on Aluminum core | 0.000393" | 2:71 | −63% ww/tool −36% grind time | Excellent |

[a]w.w./tool is the average wheel wear per tool ground.
[b]time to grind four inserts.

As seen in Table 4, wheels of the invention on both composite and aluminum cores showed improved performance in comparison to the commercial wheel. About one half of wheel wear per tool and about 30% shorter times to grind were observed.

Equivalents

While this invention has been particularly shown and described with references to preferred embodiments thereof, it will be understood by those skilled in the art that various changes in form and details may be made therein without departing from the scope of the invention encompassed by the appended claims.

What is claimed is:

1. An abrasive tool, comprising
   a) a metallic core; and
   b) an abrasive rim at a perimeter of the core, wherein the rim includes a superabrasive grain component, a filler component that includes hollow bodies and a vitreous bond component fired at a temperature below 850° C., wherein the vitreous bond includes zinc oxide and at least two alkali metal oxides.

2. The abrasive tool of claim 1 wherein the metallic core is formed of aluminum.

3. The abrasive tool of claim 1, wherein the superabrasive grain component is selected from the group consisting of diamond, cubic boron nitride and mixtures thereof.

4. The abrasive tool of claim 3, wherein the vitreous bond component further includes barium oxide.

5. The abrasive tool of claim 4, wherein the alkali metal oxides of the vitreous bond component are selected from the group consisting of sodium oxide, potassium oxide and lithium oxide.

6. The abrasive tool of claim 5, wherein the alkali metal oxides of the vitreous bond component include sodium oxide and potassium oxide.

7. The abrasive tool of claim 1, wherein the hollow bodies are hollow spheres.

8. The abrasive tool of claim 7, wherein the hollow spheres are formed of a ceramic material.

9. The method of claim 1, wherein the hollow bodies are screened to remove broken particles.

10. The method of claim 9, wherein at least 90 percent by weight of the hollow bodies have a particle size within a range of between about 20 μm and about 120 μm.

11. The abrasive tool of claim 1, wherein the superabrasive grain component is present in an amount in a range of between about 5 and about 50 percent by volume.

12. The abrasive tool of claim 11, wherein the vitreous bond component is present in a range of between about 14 and about 28 percent by volume.

13. The abrasive tool of claim 12, wherein the hollow bodies are present in an amount of at least about 10 percent by volume.

14. The abrasive tool of claim 13, wherein the hollow bodies are present in an amount in a range of between about 10 and about 30 percent by volume.

15. The abrasive tool of claim 14, wherein the tool further comprises open porosity of at least 15 percent, by volume.

16. The abrasive tool of claim 15, wherein the amount of combined alkali metal oxides is in a range of between about 5 and about 15 percent by weight of the vitreous bond component.

17. The abrasive tool of claim 16, wherein the amount of combined alkali metal oxides is in a range of between about 8 and about 12 percent, by weight of the vitreous bond component.

18. The abrasive tool of claim 1, wherein the amount of zinc oxide is in a range between about 1 and about 6 percent by weight of the vitreous bond component.

19. The abrasive tool of claim 18, wherein the amount of zinc oxide is in a range between about 2 and about 4 percent by weight of the vitreous bond component.

20. The abrasive tool of claim 19, wherein the vitreous bond component further includes barium oxide, and wherein the combined amount of zinc oxide and barium oxide is at least about 5 percent of the vitreous bond component.

21. An abrasive tool, comprising:
   a) a metallic core;
   b) an abrasive rim at the perimeter of the core, comprising a superabrasive grain component present in an amount of at least 5 percent by weight; a filler component that includes hollow bodies, the filler component being present in an amount of at least about 10 percent by weight; and a vitreous bond component that includes zinc oxide and at least two alkaline metal oxides, the vitreous bond component being present in an amount of less than about 28 percent by weight.

22. The abrasive tool of claim 21, wherein the abrasive tool is a grinding wheel.

23. The abrasive tool of claim 21, wherein the core is formed of aluminum.

24. A method of grinding a diamond-based cutting tool insert comprising the steps of:
   a) selecting an abrasive tool, wherein the tool includes a metallic core and an abrasive rim at a perimeter of the core, said abrasive rim including a superabrasive grain component, a filler component that includes hollow bodies, and a vitreous bond component that includes zinc oxide and at least two alkaline metal oxides;
   b) contacting the abrasive tool with the insert;
   c) grinding an insert edge, thereby forming an insert edge that is substantially free of chips or irregularities.

25. The method of claim 24 wherein grinding the insert includes both rough grinding and surface finishing.

26. The method of claim 24 wherein the metallic core is formed of aluminum.

* * * * *